United States Patent
Sarafianos et al.

(10) Patent No.: US 10,949,572 B2
(45) Date of Patent: Mar. 16, 2021

(54) METHOD FOR MANAGING THE VALUE OF THE SUPPLY VOLTAGE FOR A MODULE OF AN INTEGRATED CIRCUIT, AND ASSOCIATED INTEGRATED CIRCUIT

(71) Applicant: STMicroelectronics (Rousset) SAS, Rousset (FR)

(72) Inventors: Alexandre Sarafianos, Pourrieres (FR); Thomas Ordas, Pourcieux (FR); Yanis Linge, Fuveau (FR); Jimmy Fort, Puyloubier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/411,819

(22) Filed: May 14, 2019

(65) Prior Publication Data
US 2019/0354728 A1 Nov. 21, 2019

(30) Foreign Application Priority Data

May 17, 2018 (FR) ...................................... 1854118

(51) Int. Cl.
*G06F 21/75* (2013.01)
*H04L 9/00* (2006.01)
*G06F 30/327* (2020.01)

(52) U.S. Cl.
CPC ............ *G06F 21/75* (2013.01); *G06F 30/327* (2020.01); *H04L 9/002* (2013.01)

(58) Field of Classification Search
None
See application file for complete search history.

(56) References Cited

U.S. PATENT DOCUMENTS

| 6,419,159 | B1 | 7/2002 | Odinak | |
|---|---|---|---|---|
| 2014/0132337 | A1* | 5/2014 | Yannette | H03K 19/003 327/534 |
| 2014/0253072 | A1* | 9/2014 | Hussien | H02M 1/36 323/281 |
| 2018/0089356 | A1* | 3/2018 | Park | G06F 17/5081 |

FOREIGN PATENT DOCUMENTS

| WO | 02080094 A1 | 10/2002 |
|---|---|---|
| WO | 2018002939 A1 | 1/2018 |

OTHER PUBLICATIONS

INPI Search Report and Written Opinion for FR 1854118 dated Feb. 13, 2019 (8 pages).

* cited by examiner

*Primary Examiner* — Amy Cohen Johnson
*Assistant Examiner* — James H Cho
(74) *Attorney, Agent, or Firm* — Crowe & Dunlevy

(57) ABSTRACT

The supply voltage for a module of an integrated circuit managed to support protection against side channel attacks. Upon startup of the integrated circuit, one action from the following actions is selected in response to a command: supplying the module with the supply voltage having a fixed value that is selected from a plurality of predetermined values, or varying the value of the supply voltage in time with a pulsed signal.

19 Claims, 9 Drawing Sheets

supplying the module with the supply voltage having a fixed value that is selected from among a plurality of predetermined values; and varying the value of the supply voltage in time with a pulsed signal.

Thus, since the value of the supply voltage, and hence of the consumed current, may change, it is more difficult to analyze the electromagnetic emissions of the integrated circuit. This circuit is therefore better protected from side channel attacks.

The pulsed signal may be a clock signal.

The pulsed signal may be a random pulsed signal.

The value of the command allowing the selection operation may be parameterized before starting up the integrated circuit.

This parameterizing operation may include a predetermined value of the command for selecting, upon each startup, one of the actions mentioned above, or else include randomly selecting the value of the command from among possible values of the command corresponding to the various actions that may be selected, respectively.

This parameterizing operation may for example be carried out in the factory or else by the user when personalizing the integrated circuit.

According to another aspect, provision is made for an integrated circuit including a module that is supplied with a supply voltage, the integrated circuit including a configurable device for managing the supply voltage that is configured, upon starting up the integrated circuit and in response to a command, to select and to carry out one action from among the following actions:

supply the logic module with the supply voltage having a fixed value that is selected from a plurality of predetermined values; and vary the value of the supply voltage in time with a pulsed signal.

The integrated circuit may include a voltage regulator that is configured to deliver the supply voltage and may be configured:

in a first configuration, to deliver a control signal having a fixed value to the voltage regulator, the voltage regulator being configured to deliver the supply voltage having a fixed value upon receiving the control signal, and in a second configuration, to deliver, to the voltage regulator, the control signal whose value may vary among a plurality of values, the voltage regulator being configured to deliver the supply voltage whose value depends on the value of the control signal.

The integrated circuit includes a control unit that is configured to deliver the command to the device in order to place it in its first configuration or in its second configuration.

It may be possible to parameterize the control unit so as to deliver the command according to an input parameter.

The device may include selecting circuitry having a first multiplexer including a plurality of inputs, each of which is configured to receive a signal having a distinct predefined value, an output that is coupled to the regulator and configured to deliver the control signal having one of the predefined values, and a control input that is coupled to control circuitry that is configured to select one of the predefined values.

The selecting circuitry may be configured, in the first configuration, to select the fixed value from among the plurality of predefined values upon starting up the integrated circuit.

METHOD FOR MANAGING THE VALUE OF THE SUPPLY VOLTAGE FOR A MODULE OF AN INTEGRATED CIRCUIT, AND ASSOCIATED INTEGRATED CIRCUIT

PRIORITY CLAIM

This application claims the priority benefit of French Application for Patent No. 1854118, filed on May 17, 2018, the content of which is hereby incorporated by reference in its entirety to the maximum extent allowable by law.

TECHNICAL FIELD

Implementations and embodiments relate to integrated circuits, in particular but not exclusively to those including secure modules, and in particular to the protection of this type of circuit from side channel analysis, and more particularly from analysis of the current consumption of the integrated circuit during its operation.

BACKGROUND

In particular, a logic circuit, for example a logic gate, has a different current consumption during a transition of the signal delivered by its output terminal from a low state to a high state than during a transition from a high state to a low state.

These consumptions also vary from one logic gate to the next. Thus, for example, in the case of a transition from a low state to a high state, the consumption of an inverter logic gate will be different from the consumption of an AND gate.

By analyzing the consumption of the circuit, by virtue of dedicated mathematical algorithms, it is therefore possible to obtain information on the operations carried out and on the data manipulated and/or on their occurrences. This is referred to in the art as a side channel attack.

In particular, during the switching of its logic components, an integrated circuit produces electromagnetic signals via metal tracks of the integrated circuit through which the consumed current flows. It is possible to analyze the current consumption of the integrated circuit via these electromagnetic signals.

Solutions for masking the current consumption of an integrated circuit do exist, for example by forming a plurality of additional logic gates that are not involved in the secure operations, by switching these additional logic gates randomly so as to cause the integrated circuit to consume additional power and hence produce additional electromagnetic emissions that are independent of the secure operations.

However, although this solution is advantageous, it may in certain cases be difficult to implement.

Furthermore, there is a need to provide more economical solutions.

SUMMARY

Thus, in one embodiment, provision is made for an integrated circuit in which variations in a supply voltage for a module are generated that are independent of the secure operations performed by the integrated circuit.

According to one aspect, provision is made for a method for managing the supply voltage for a module of an integrated circuit, wherein, upon starting up the integrated circuit, one action from among the following actions is selected in response to a command:

The selecting circuitry may be configured, in the second configuration, to select the fixed value from among the plurality of predefined values in time with a pulsed signal.

The device may include clocking circuitry that is configured, in the second configuration, to deliver the pulsed signal to the control circuitry, the control circuitry being configured to select a new predefined value on each pulse of the pulsed signal.

The pulsed signal may be a clock signal.

The pulsed signal may be a random pulsed signal.

The clocking circuitry includes delaying circuitry that is configured, randomly, to apply or not to apply a delay to each pulse of the pulsed signal.

According to one aspect, provision is made for a system including an integrated circuit such as described above, wherein the module is configured to perform secure operations.

This system may, for example, be a chip card.

BRIEF DESCRIPTION OF THE DRAWINGS

Other advantages and features will become apparent upon examining the detailed description of completely non-limiting embodiments and implementations of the invention and the appended drawings, in which.

DETAILED DESCRIPTION

Figure 1:
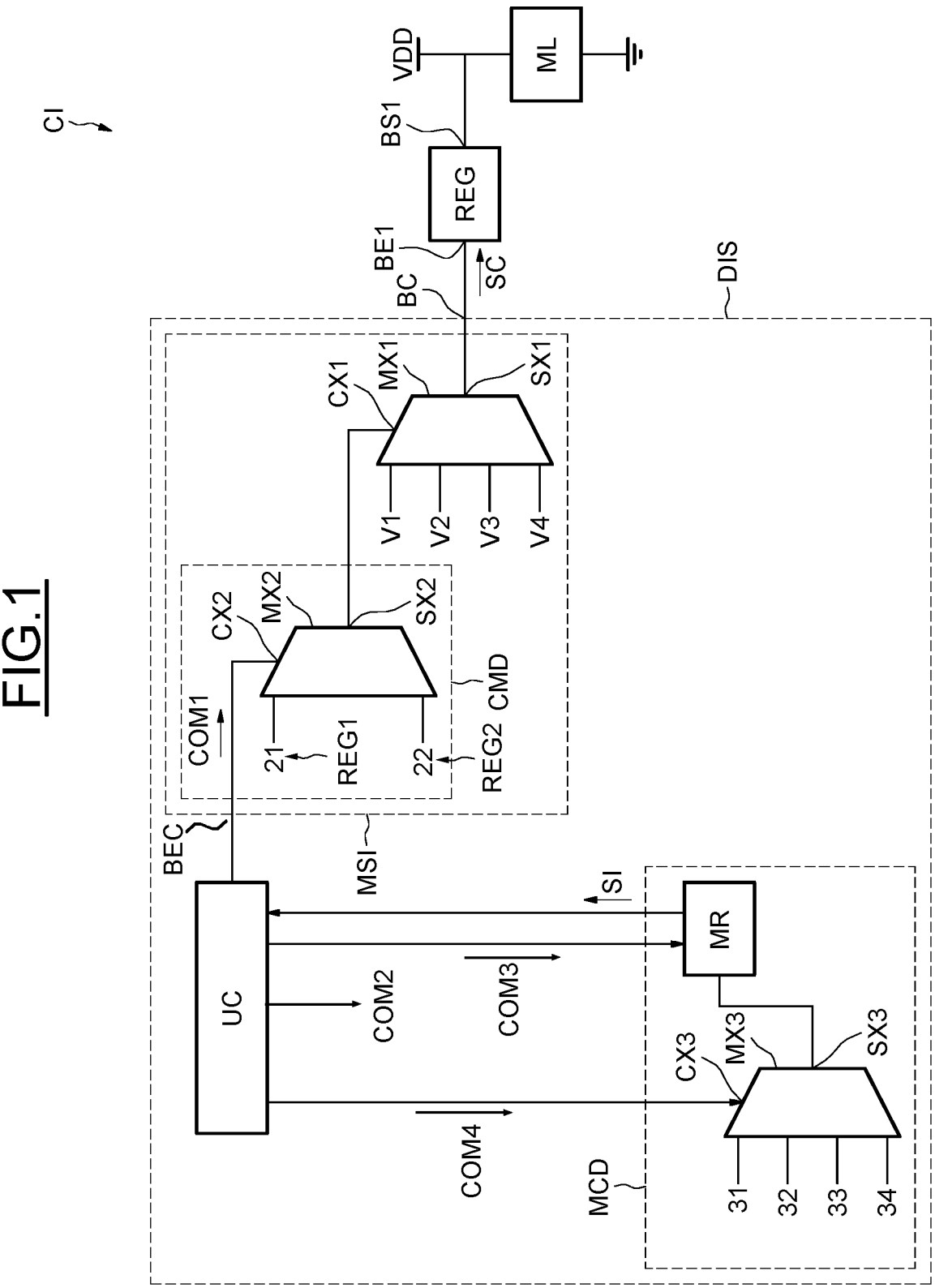
FIG. 1 is a schematic block diagram of an integrated circuit including a logic module configured to carry out secure operations, in accordance with this disclosure.

FIG. 1 illustrates an integrated circuit CI including a logic module ML that is configured to carry out secure operations. The module is supplied with a supply voltage VREG that is delivered by a voltage regulator REG. Here, the voltage regulator REG, supplied with a voltage VDD, is controllable, i.e., it is capable of delivering a supply voltage VREG that is able to take different values according to the value of a control signal SC.

The voltage regulator REG includes an input terminal BE1 that is configured to receive the control signal SC and an output terminal BS1 that is coupled to the logic module ML and configured to deliver the supply voltage VREG.

The integrated circuit CI further includes a device DIS for managing the supply voltage VREG, including a control terminal BC that is configured to deliver the control signal SC, and a control input terminal BEC that is capable of receiving a first command COM1 from a control unit UC.

The device DIS establishes the value of the control signal SC, and hence of the supply voltage VREG, in response to the first delivered command COM1.

The device DIS includes selecting circuitry MSI that is configured to select the value of the control signal SC from among a plurality of predefined values, and clocking circuitry MCD that is capable of delivering a pulsed signal SI to the control unit UC.

In a first configuration of the device DIS, the selecting circuitry MSI is configured to deliver the control signal SC having a value that is selected from among a plurality of values, here four values, and that is fixed over the entire duration of operation of the device DIS. The voltage regulator REG then delivers the supply voltage VREG that is dependent on the value of the control signal SC, which remains fixed over the entire duration of operation of the integrated circuit.

In this first configuration, the clocking circuitry MCD is deactivated, and therefore does not deliver the pulsed signal SI. The value of the control signal SC is then selected upon the integrated circuit CI starting up, in response to the first command COM1 from the control unit UC.

In a second configuration of the device DIS, the clocking circuitry MCD is activated, and delivers the pulsed signal SI to the control unit UC.

In this second configuration, the selecting circuitry MSI is configured to deliver the control signal SC, the value of which is variable and may take any value from among the plurality of values.

The value of the control signal SC, and hence of the supply voltage VREG, varies in time with the pulses of the pulsed signal SI.

The selecting circuitry MSI includes the control output terminal BC, which is configured to deliver the control signal SC, and the control input terminal BEC, which is configured to receive the first control signal COM1 from the control unit UC.

The selecting circuitry MSI includes a first multiplexer MX1, and control circuitry CMD including a second multiplexer MX2.

The first multiplexer MX1 includes a plurality of inputs, here four inputs that are referenced V1, V2, V3, and V4, and a single output SX1 forming the control output terminal BC of the device DIS and a control input CX1.

Each of the inputs V1, V2, V3, and V4 is configured to receive a signal having a first value, a second value, a third value and a fourth value, respectively, each corresponding to a distinct value of the control signal SC, and hence to a distinct value of the supply voltage VREG.

Here for example, the values of the signals on the inputs V1, V2, V3 and V4 correspond to values of the supply voltage VREG of 1 volt, 1.1 volts, 1.2 volts, and 1.3 volts, respectively.

The second multiplexer MX2 includes two inputs 21 and 22 and a control input CX2 that is coupled to the control unit UC, forming the control input terminal BEC, and an output terminal SX2 that is coupled to the control input CX1 of the first multiplexer MX1.

The first input 21 of the second multiplexer MX2 is coupled to a first register REG1 that is configured to deliver a signal whose value corresponds here to selecting the third input V3 of the first multiplexer MX1. The value of the control signal SC that is associated with the third input V3 of the third multiplexer MX1 here acts as the default value.

It would however be possible for the value contained in the first register REG1 to correspond to a value of the control signal SC corresponding to selecting another value of the supply voltage VREG, which would then be the default value.

The second input 22 of the second multiplexer MX2 is coupled to a second register REG2 including four values and is configured to deliver a signal whose value is any one of the four values contained in the register, selected randomly.

Thus, selecting the second input 22 of the second multiplexer MX2 corresponds to randomly selecting any one of the inputs of the first multiplexer MX1.

The control unit UC is configured, in the first configuration, to select the first or the second input 21 of the second multiplexer MX2 and to deactivate the clocking circuitry MCD. In the second configuration, the control unit UC is configured to select the second input 22 of the second multiplexer MX2, to activate the clocking circuitry MCD, and to send a second command COM2 to the second register REG2 in time with the pulses of the pulsed signal SI, so that the value delivered by the second register REG2 to the second input 22 of the second multiplexer MX2 changes in time with the pulses of the pulsed signal SI.

For example, the control unit UC may be configured during the fabrication of the integrated circuit CI, so that for example the device DIS is always in its first configuration or always in its second configuration.

It would also be possible to configure the control unit UC such that, upon starting up the integrated circuit CI, the control unit UC randomly selects one of the configurations.

The clocking circuitry MCD includes a third multiplexer MX3 including a plurality of inputs, here four inputs 31, 32, 33 and 34, and an output SX3 that is configured to deliver the pulsed signal SI.

A first input 31 is configured to receive a pulsed signal whose pulses are generated randomly, a second input 32 is configured to receive a pulsed signal that is a clock signal, i.e., whose pulses exhibit high states and low states of identical durations, a third input 33 is configured to receive a pulsed signal whose frequency is 10 times lower than the frequency of the clock signal, and a fourth input 34 is configured to receive a pulsed signal SI whose frequency is n times lower than the frequency of the clock signal, n being an integer that may be chosen randomly, for example by the control unit UC.

The output SX3 of the third multiplexer MX3 is coupled to the control unit UC via delaying circuitry MR that is configured to randomly choose to apply or not to apply a delay to each pulse of the pulsed signal SI.

The delaying circuitry MR is coupled to the control unit UC, and is capable of receiving a third command COM3 from the control unit UC, the third command COM3 corresponding to a command to activate or to deactivate the delaying circuitry MR. If the delaying circuitry MR is deactivated, the pulsed signal SI is transmitted to the control unit UC without being delayed.

The control input CX3 of the third multiplexer MX3 is coupled to the control unit UC and is capable of receiving a fourth command COM4 corresponding to selecting one of the inputs of the third multiplexer MX3.

Figure 2:
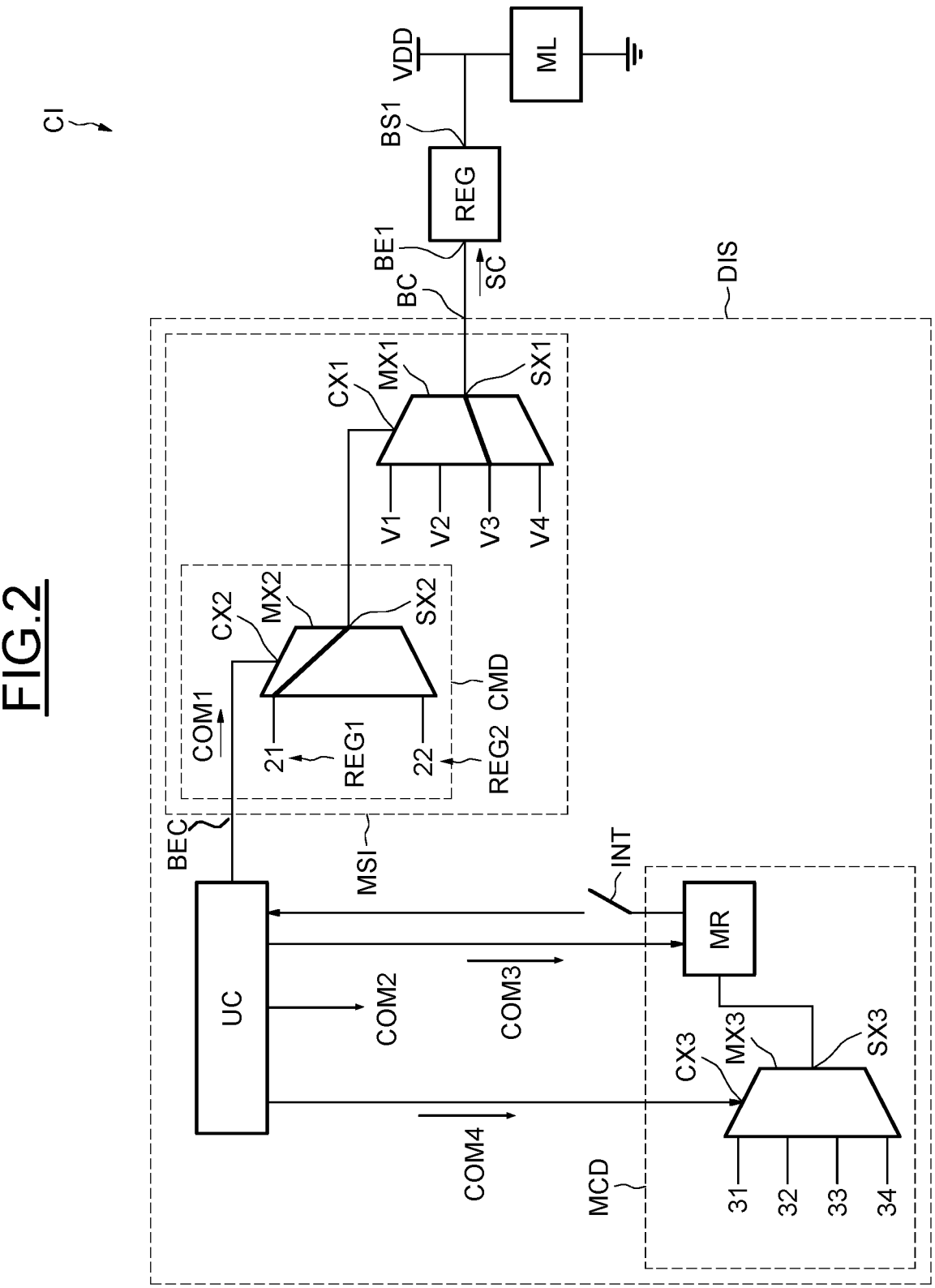
FIG. 2 illustrates the integrated circuit of FIG. 1 when operating in a first configuration.
Figure 3:
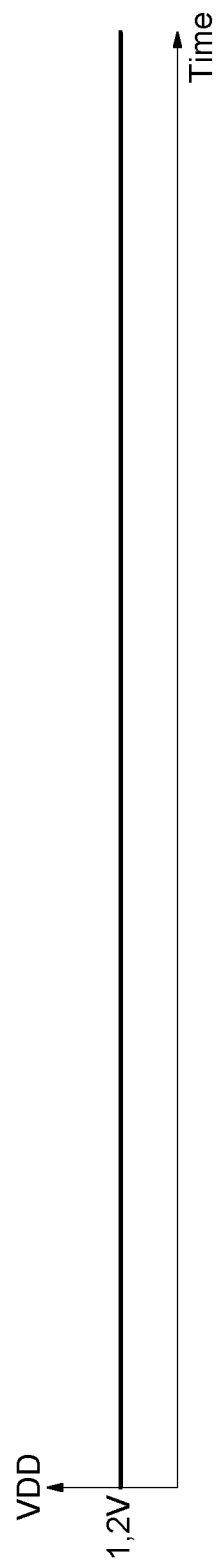
FIG. 3 is a graph of the supply voltage generated over time when the integrated circuit is operating according to the configuration shown in FIG. 2.

FIGS. 2 and 3 illustrate one embodiment in which the device DIS is in the first configuration. In this first configuration, the clocking circuitry MCD is deactivated.

For the sake of simplicity, the deactivation of the clocking circuitry MCD is illustrated in FIG. 2 by an open switch INT. The clocking circuitry could in practice be deactivated by any conventional circuitry that could be selected by a person skilled in the art.

In this embodiment, the control unit UC is configured, upon the device DIS starting up, to select the first input 21 of the second multiplexer MX2; thus, the third input V3 of the first multiplexer MX1 is selected.

The control signal SC therefore has the third value here. Upon receiving this signal, as illustrated in FIG. 3, the voltage regulator REG will generate the supply voltage VREG having the first value, here 1.2 V, and this voltage will be maintained for the entire duration of operation of the integrated circuit.

Figure 4:
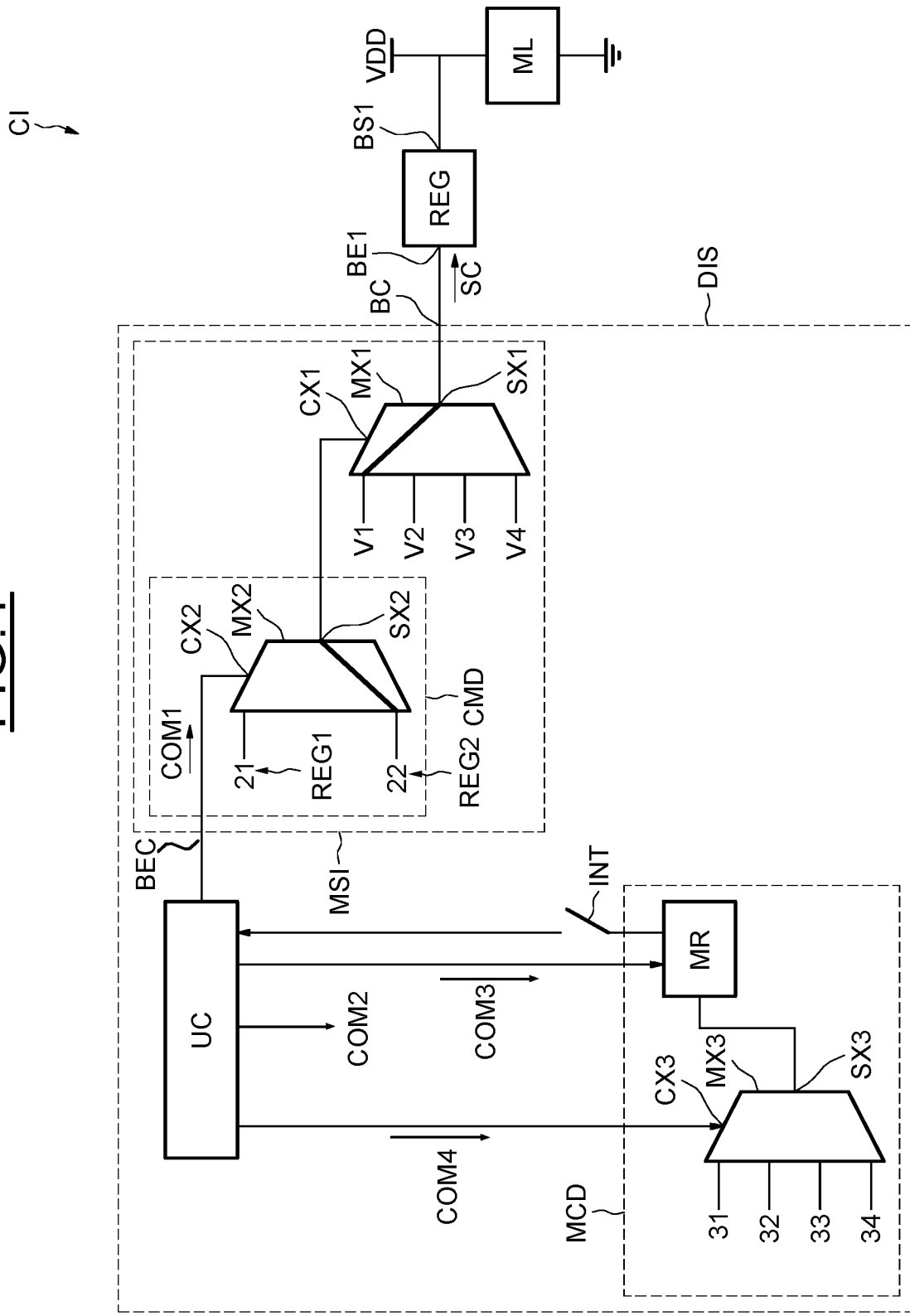
FIG. 4 illustrates the integrated circuit of FIG. 1 when operating in an alternate mode of its first configuration.
Figure 5:
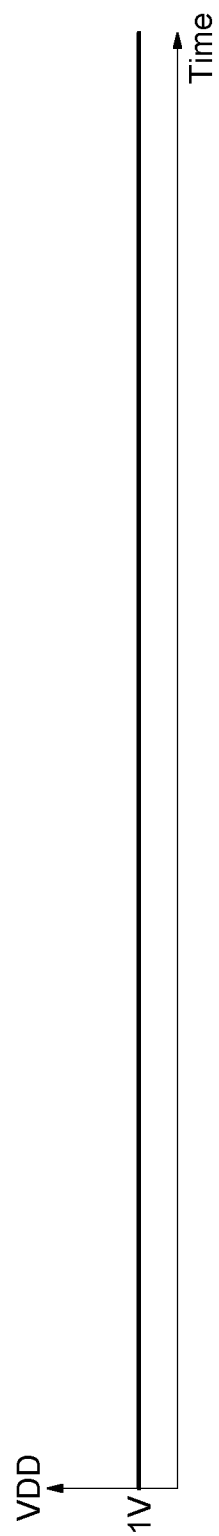
FIG. 5 is a graph of the supply voltage generated over time when the integrated circuit is operating according to the configuration shown in FIG. 4.

FIGS. 4 and 5 illustrate an alternative mode of operation of the device DIS in its first configuration.

In this embodiment, the control unit UC is configured, upon the device DIS starting up, to select the second input 22 of the second multiplexer MX2; thus, the second register delivers a signal corresponding to any one of the values that it contains, and consequently the corresponding input V1, V2, V3, or V4 of the first multiplexer MX1 is selected randomly. Here for example the first input V1 is selected.

The control signal SC therefore has the first value here. Upon receiving this signal, as illustrated in FIG. 5, the voltage regulator REG generates the supply voltage VREG having the first value, here 1 volt, and this voltage will be maintained for the entire duration of operation of the integrated circuit CI (i.e, from startup to shut down).

Thus, each time the integrated circuit CI starts up, the supply voltage VDD may be different, thereby making a side channel attack more difficult.

Figure 6:
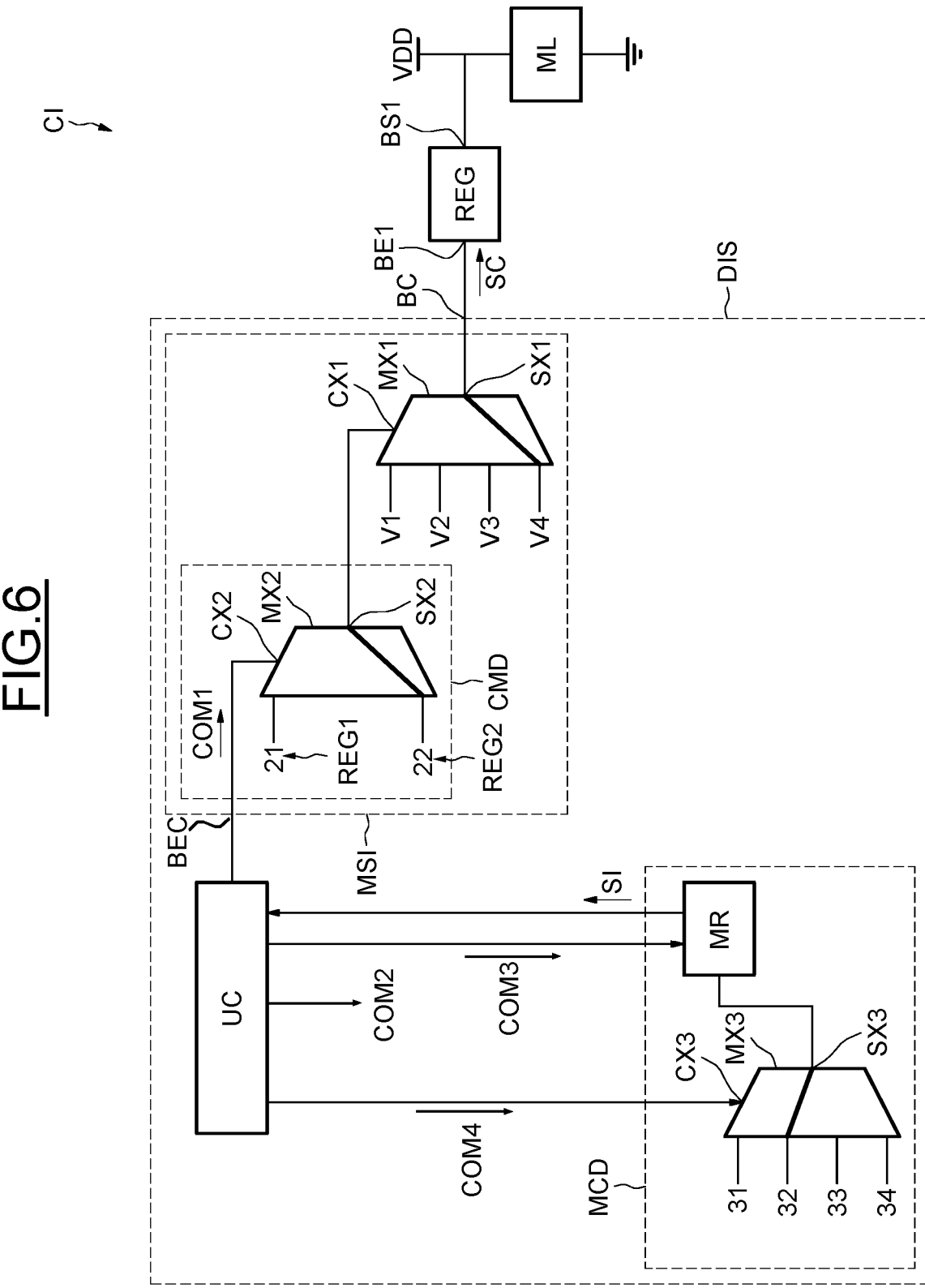
FIG. 6 illustrates the integrated circuit of FIG. 1 when operating in a second configuration.
Figure 7:
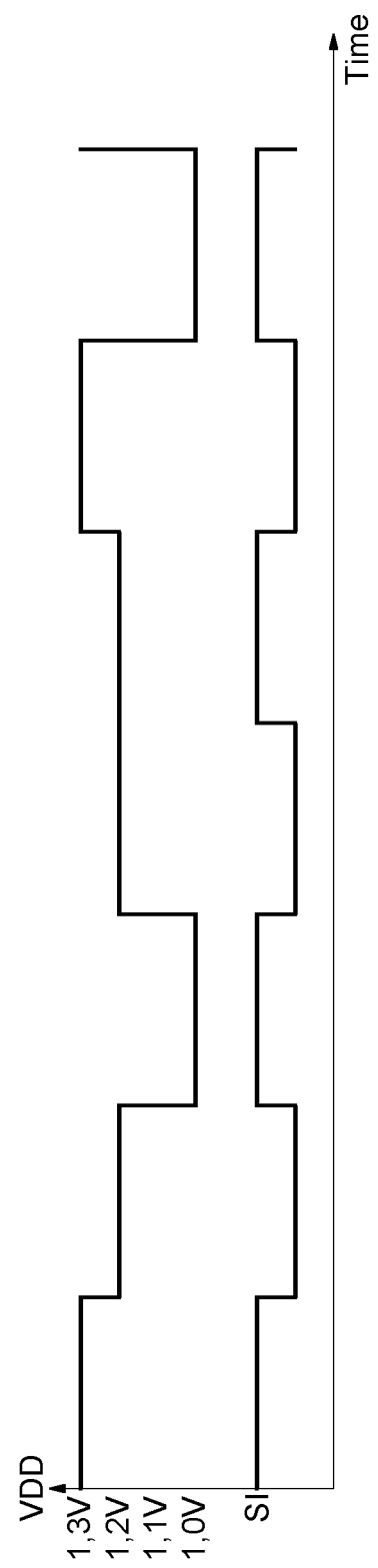
FIG. 7 is a graph of the supply voltage generated over time when the integrated circuit is operating according to the configuration shown in FIG. 6.

FIGS. 6 and 7 illustrate one embodiment in which the device DIS is in its second configuration.

In this embodiment, the clocking circuitry MCD is activated, and the control unit UC is configured to select the second input 22 of the third multiplexer MX3.

The clocking circuitry MCD is configured to deliver the pulsed signal SI that is a clock signal.

Upon each pulse of the pulsed signal SI, the control unit UC sends the second command COM2 to the second register REG2, which responds by selecting any one of the four values that it contains and delivers it to the second input 22.

Thus, as illustrated in FIG. 7, upon each pulse of the pulsed signal SI, the regulator delivers the supply voltage VREG, which potentially has a new value from among 1 volt, 1.1 volts, 1.2 volts, and 1.3 volts.

The operation of the device DIS when the third input 33 or the fourth input 34 of the third multiplexer MX3 is selected is analogous to this embodiment, except that the frequency of the pulsed signal is 10 times lower or n times lower, respectively.

Figure 8:
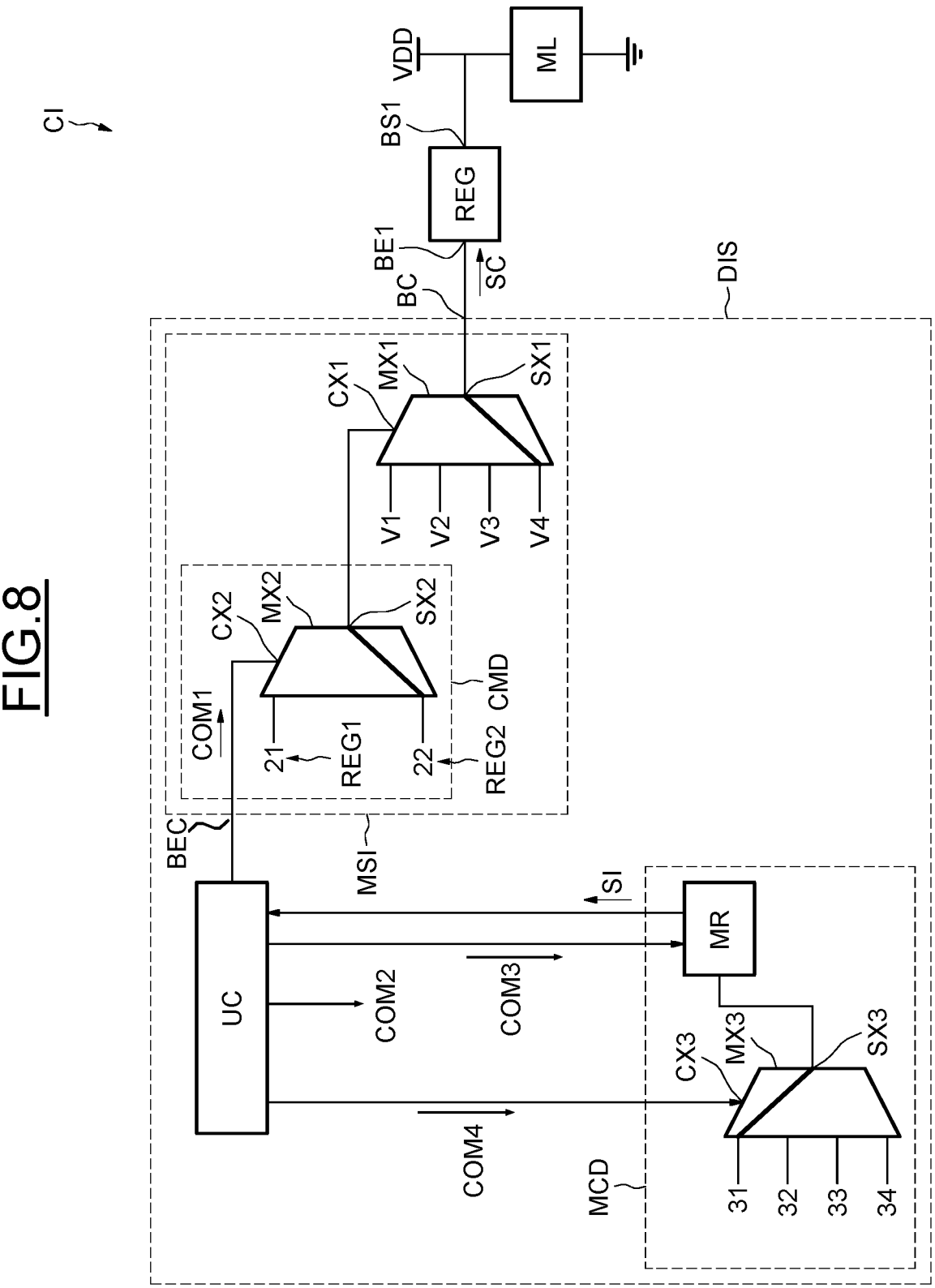
FIG. 8 illustrates the integrated circuit of FIG. 6 when operating in an alternate mode of its second configuration.
Figure 9:
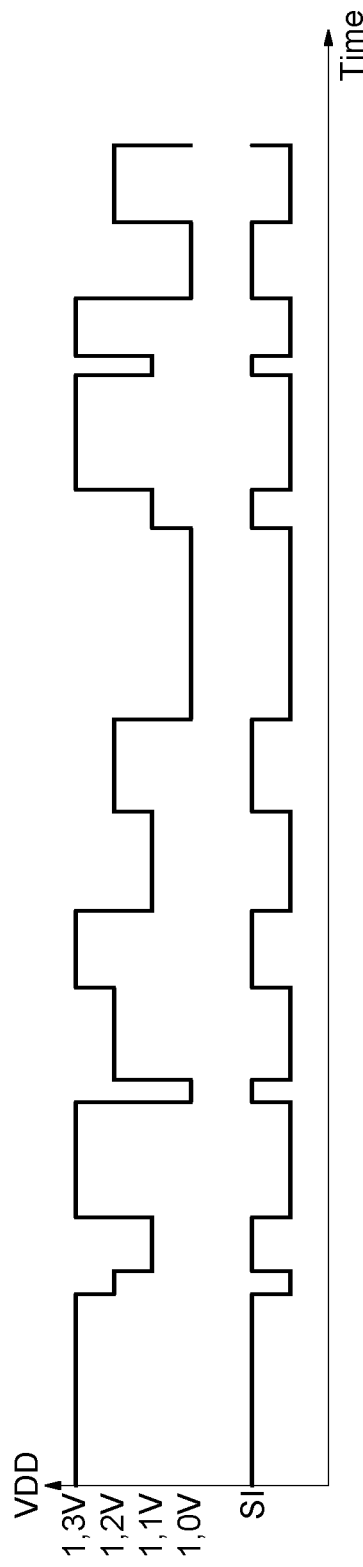
FIG. 9 is a graph of the supply voltage generated over time when the integrated circuit is operating according to the configuration shown in FIG. 8.

According to one operational variant illustrated in FIGS. 8 and 9, the control unit UC may be configured to select the first input 31 of the third multiplexer MX3. Thus, the pulsed signal SI will be a random signal, and, as illustrated in FIG. 8, the regulator REG will then be configured to deliver the supply voltage VREG whose value varies randomly, in time with the pulsed signal SI.

In conjunction with the second configuration of the device DIS, it would be possible for the control unit UC to activate the delaying circuitry MR, such that at least some of the pulses are delayed by a predefined delay, or by a delay chosen from among a plurality of possible delays.

This advantageously allows the random nature of the device DIS to be enhanced, and hence a side channel attack to be made even more difficult.

A regular pulsed signal, for example a clock signal, in which a delay is randomly applied or not applied to its pulses, may be considered to be a random pulsed signal.

Applying potential delays to the pulses of a clock signal is therefore an alternative way of obtaining a random pulsed signal, with respect to selecting the second input 32 of the third multiplexer MX3.

Figure 10:
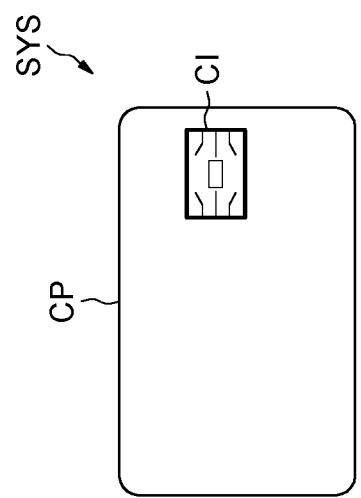
FIG. 10 is a block diagram showing the integrated circuit of FIG. 1 as integrated into a chip card.

The integrated circuit CI described above in conjunction with FIGS. 1 to 9 may be incorporated within any type of system SYS in which robust protection from side channel attacks is beneficial, for example a chip card CP such as that illustrated in FIG. 10.

The invention claimed is:

1. A method for managing a supply voltage for a module of an integrated circuit, comprising:
   receiving a command in response to starting the integrated circuit;
   in response to the received command being a first command type, supplying the module with the supply voltage having a fixed voltage value that is selected from among a plurality of predetermined voltage values; and
   in response to the received command being a second command type, supplying the module with the supply voltage having a variable voltage value that is changed among and between the plurality of predetermined voltage values in time with a pulsed signal, wherein the pulsed signal is a random pulsed signal.

2. The method according to claim 1, wherein the pulsed signal is a clock signal.

3. The method according to claim 1, wherein the command has a value that is parameterized before starting up the integrated circuit.

4. An integrated circuit, comprising:
   a logic module that is supplied with a supply voltage; and
   a configurable device for managing the supply voltage that is configured, upon startup of the integrated circuit, to receive a command and:
      in response to the received command being a first command type, supply the logic module with the supply voltage, wherein the supply voltage has a fixed voltage value that is selected from a plurality of predetermined voltage values; and
      in response to the received command being a second command type, supply the logic module with the supply voltage, wherein a voltage value of the supply voltage is varied among the plurality of predetermined voltage values in time with a pulsed signal, wherein the pulsed signal is a randomly pulsed signal.

5. The integrated circuit according to claim 4, wherein the pulsed signal is a clock signal.

6. A system including an integrated circuit according to claim 4, wherein the logic module is configured to perform secure operations.

7. The system according to claim 6, wherein the system is a chip card.

8. An integrated circuit, comprising:
   a logic module that is supplied with a supply voltage;
   a configurable device for managing the supply voltage that is configured, upon startup of the integrated circuit and in response to a command, to select and to perform one of:
      supplying the logic module with the supply voltage, wherein the supply voltage has a fixed voltage value that is selected from a plurality of predetermined voltage values; and
      supplying the logic module with the supply voltage, wherein a voltage value of the supply voltage is varied among the plurality of predetermined voltage values in time with a pulsed signal;
   a voltage regulator configured to deliver the supply voltage;
   wherein the configurable device is further configured:
      in a first configuration, to deliver a control signal to the voltage regulator having a fixed control value, the voltage regulator being configured, upon receiving the control signal, to deliver the supply voltage as having the selected fixed voltage; and
      in a second configuration, to deliver the control signal to the voltage regulator having a value that varies among a plurality of values in time with the pulsed signal, the voltage regulator being configured, upon receiving the control signal, to deliver the supply voltage as having the voltage value dependent on the value of the control signal; and
   wherein the integrated circuit includes a control unit configured to deliver the command to the configurable device in order to place it in one of the first configuration or second configuration.

9. The integrated circuit according to claim 8, wherein the control unit is parameterized so as to deliver the command according to an input parameter.

10. The integrated circuit according to claim 8, wherein the configurable device includes selecting circuitry comprising a first multiplexer including a plurality of inputs, each of which is configured to receive a signal having one of the plurality of predetermined voltage values, an output that is coupled to the voltage regulator and configured to deliver the control signal as having one of the plurality of predetermined voltage values, and a control input that is coupled to control circuitry that is configured to select one of the plurality of predetermined voltage values.

11. The integrated circuit according to claim 10, wherein the selecting circuitry is configured, in the first configuration, to select the fixed voltage value from among the plurality of predetermined voltage values upon starting up the integrated circuit.

12. The integrated circuit according to claim 10, wherein the selecting circuitry is configured, in the second configuration, to select the fixed voltage value from among the plurality of predetermined voltage values in time with the pulsed signal.

13. The integrated circuit according to claim 10, wherein the configurable device includes clocking circuitry that is configured, in the second configuration, to deliver the pulsed signal to the control circuitry, the control circuitry being configured to select a new one of the plurality of predetermined voltage values on each pulse of the pulsed signal.

14. The integrated circuit according to claim 13, wherein the clocking circuitry includes delaying circuitry that is configured, randomly, to apply or not to apply a delay to each pulse of the pulsed signal.

15. An integrated circuit, comprising:
   a control unit configured to generate a first control signal;
   first selection circuitry configured to output a second control signal, the second control signal being either predetermined or random, based upon the first control signal;
   second selection circuitry configured to pass a predetermined one of a plurality of input signals as a third control signal based upon the second control signal being predetermined, and to pass a random one of the plurality of input signals as output based upon the second control signal being random;
a voltage regulator configured to generate a supply voltage dependent upon the third control signal; and
a logic module powered by the supply voltage.

16. The integrated circuit of claim 15, further comprising clocking circuitry configured to pass one of a plurality of clock inputs as a fourth control signal at each iteration of the integrated circuit, the plurality of clock inputs including at least a random pulsed signal and a clock signal; and wherein the control unit generates the first control signal based upon the fourth control signal.

17. The integrated circuit of claim 16, further comprising delay circuitry configured to selectively delay pulses of the fourth control signal.

18. The integrated circuit of claim 16, wherein the iterations of the integrated circuit are startups of the integrated circuit.

19. The integrated circuit of claim 16, wherein the plurality of clock inputs also include first and second divided versions of the clock signal, the first divided version of the clock signal being the clock signal divided by a predetermined integer, the second divided version of the clock signal being the clock signal divided by a random integer.

* * * * *